(12) United States Patent
Rullmann et al.

(10) Patent No.: US 6,370,751 B1
(45) Date of Patent: Apr. 16, 2002

(54) DISPOSABLE SEAL DRIVER AND KIT

(75) Inventors: Douglas C. Rullmann, Trevor; Laurence B. Winn, Walworth, both of WI (US)

(73) Assignee: Triseal Corporation, Hebron, IL (US)

( * ) Notice: Subject to any disclaimer, the term of this patent is extended or adjusted under 35 U.S.C. 154(b) by 0 days.

(21) Appl. No.: 09/506,954

(22) Filed: Feb. 18, 2000

(51) Int. Cl.⁷ .................................................. B23P 19/04
(52) U.S. Cl. ........................ 29/235; 29/221.6; 29/273; 29/275
(58) Field of Search ................................ 29/235, 221.5, 29/221.6, 255, 273, 280, 283.5, 282, 275

(56) References Cited

U.S. PATENT DOCUMENTS

| | | | |
|---|---|---|---|
| 1,069,539 A | | 8/1913 | Evans, Jr. |
| 2,851,769 A | * | 9/1958 | Johnson ........................ 29/235 |
| 2,998,644 A | | 9/1961 | Thill |
| 3,637,244 A | * | 1/1972 | Strizki ........................ 287/129 |
| 4,515,376 A | | 5/1985 | Okamuro |
| 4,586,228 A | * | 5/1986 | Rodolf ........................ 29/235 |
| 4,586,229 A | | 5/1986 | Rodolf |
| 4,667,994 A | * | 5/1987 | Foshee ........................ 292/358 |
| 5,013,050 A | | 5/1991 | Lansdale |
| 5,052,695 A | | 10/1991 | Curtis |
| 5,235,734 A | * | 8/1993 | DuRocher et al. ......... 29/455.1 |
| 5,606,897 A | * | 3/1997 | Quinn ........................ 81/124.6 |
| 5,799,521 A | * | 9/1998 | Kennedy ..................... 70/416 |
| 5,830,049 A | * | 11/1998 | Haley et al. .................. 452/6 |
| 5,933,894 A | * | 8/1999 | Bates ............................ 7/164 |
| 6,216,413 B1 | * | 4/2001 | Lapointe .................... 52/726.3 |

* cited by examiner

Primary Examiner—Joseph J. Hail, III
Assistant Examiner—Lee Wilson
(74) Attorney, Agent, or Firm—Thomas R. Vigil

(57) ABSTRACT

The disposable seal driver is used for driving in a hub oil seal into a cavity or counterbore for receiving same. The seal driver comprises a metal cup-shaped member having a top flat wall, an intermediate Fausto-conical wall and a lower cylindrical skirt having a circular bottom drive edge. The seal driver can be part of a seal driver kit also including a short piece of wood.

13 Claims, 2 Drawing Sheets

DISPOSABLE SEAL DRIVER AND KIT

BACKGROUND OF THE INVENTION

1. Field of the Invention

The present invention relates to a disposable seal driver and kit for driving in vehicle shaft seals into a bore or cavity in housing surrounding a vehicle shaft, such as found on trucks.

2. Description of the Prior Art

Heretofore various devices for installing vehicle shaft seals around a vehicle shaft in a bore or cavity in a housing for the shaft seal have been proposed. Examples of previously proposed analogous and non-analogous shaft seal installation kits and devices are disclosed in the following analogous and non-analogous U.S. patents listed below:

| U.S. Pat. No. | Patentee |
| --- | --- |
| 1,069,539 | Evans, Jr. |
| 2,998,644 | Thill |
| 2,851,769 | Johnson |
| 4,515,376 | Okamuro |
| 4,586,228 | Rodolf |
| 5,013,050 | Lansdale |
| 5,052,695 | Curtis |

The Evans, Jr. U.S. Pat. No. 1,069,539 discloses a device for expanding an undulated ring by applying pressure against the undulated ring and moving it downwardly over a frusto-conical portion of an anvil, thereby to expand the ring. The ring is pressed downwardly by a bell-shaped follower by rotating a screw thread shaft.

The Thill U.S. Pat. No. 2,998,644 discloses a seal driver having an elongate shaft fixed to a plate mounting a ring-shaped molded plastic adaptor member which is adapted to seat against a seal for driving the seal into a cavity and onto a seat.

The non-analogous Johnson U.S. Pat. No. 2,851,769 discloses a pliers-like grease cap assembly for mounting a generally cup-shaped grease cap over a wheel bearing hub.

The Okamuro U.S. Pat. No. 4,515,376 discloses a seal installation device including a first generally cylindrical handle part and a second generally cylindrical handle. part, the first part being hollow and reciprocally receiving the second handle part. A seal is first placed onto the outside of the first handle part and the two handle parts are moved for placement of the seal into a counterbore.

The Rodolf U.S. Pat. No. 4,586,228 discloses a tool kit for installing transmission seals which includes a composite driver having an elongate base and a separate adapter. The adapter is generally hat-shaped and is adapted to mount a seal thereon and the elongate base portion has a socket for engaging one of a plurality of adapters mounting a seal and is adapted to provide a driver which can be hit with a hammer for driving the seal on the adapter into a hole for receiving the seal.

The Lansdale U.S. Pat. No. 5,013,050 discloses a disposable seal installation tool having a head capable of being hit with a hammer or mallet, an annular flange and a cylindrical support area for mounting a seal to be pounded into a bore.

The Curtis U.S. Pat. No. 5,052,695 discloses a seal installation tool having the same general shape of the tool disclosed in the Lansdale U.S. Pat. No. 5,013,050 including a head, an annular flange and a cylindrical portion having a cylindrical surface on which a shaft seal is demountably mounted.

SUMMARY OF THE INVENTION

According to the present invention, there is provided a disposable seal driver for driving in a hub oil seal into a cavity or counterbore for receiving same. The seal driver comprises a metal cup-shaped member having a top flat wall, an intermediate frusto-conical wall and a lower cylindrical skirt having a circular bottom drive edge. The seal driver can be part of a seal driver kit also including a short piece of wood.

DESCRIPTION OF THE PREFERRED EMBODIMENT(S)

Figure 1:
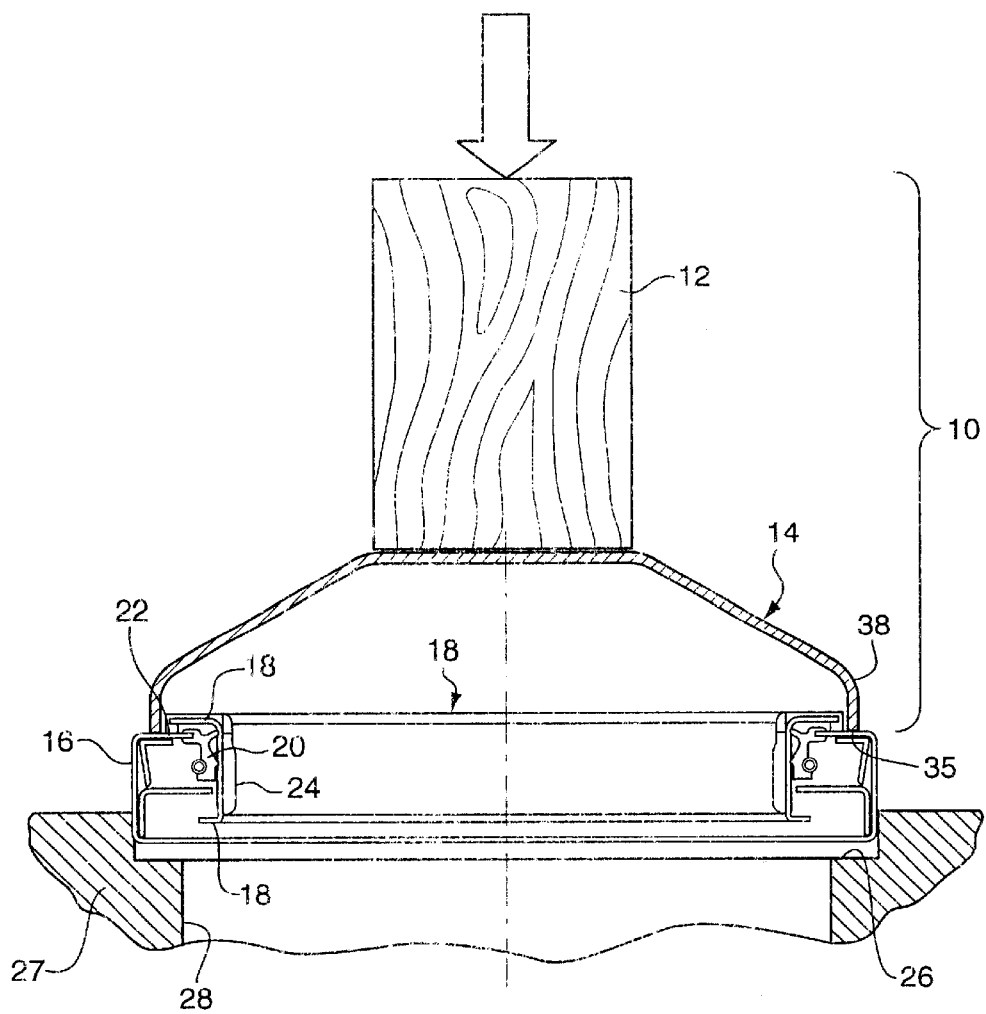
FIG. 1 is a vertical sectional view through a seal driver installation kit and seal and counterbore which receives the vehicle shaft seal.
Figure 2:
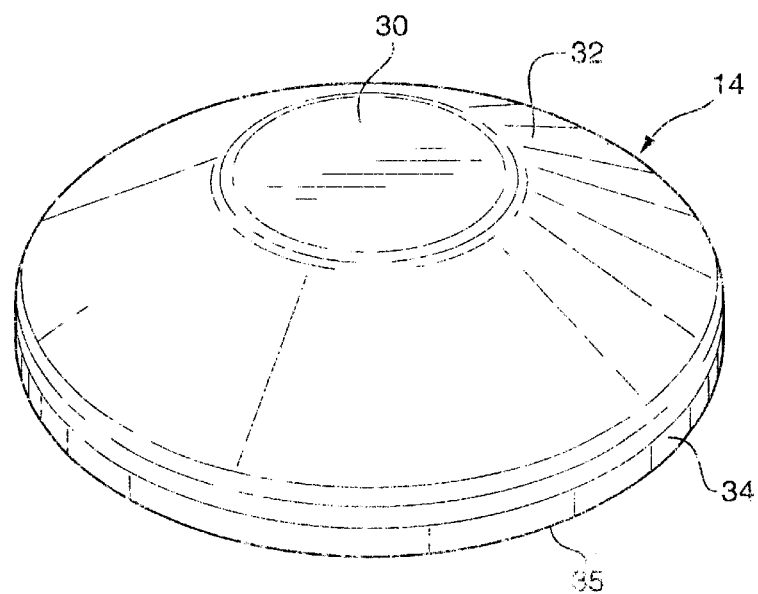
FIG. 2 is a perspective view of a cup-shaped disposable seal driver of the present invention.

Referring now to FIG. 1, there is illustrated therein a disposable tool kit 10 comprising a short piece of wood 12, such as a 1"×1" piece of wood and a disposable, generally cup-shaped, metal seal driver 14. Positioned below the driver 14 is an outer ring 16 of a conventional shaft seal 18 which also comprises an inner ring 18 and a sealing lip 20 extending from a flange 22 of the outer ring 16 to the inner ring 18. The inner ring 18 also has an elastic sealing surface 24 on an inner periphery thereof, as shown.

The shaft seal 18 is positioned to be mounted in a cavity or counterbore 26 in a housing 27 and around a throughbore 28 in the housing 27 which receives a vehicle shaft, such as a truck shaft, not shown. The shaft seal 18 is often referred to as hub oil seal 18. Typically, such hub oil seals 18 are mounted in an area which has limited access and typically a specialized tool is often required for successful installation of the seal. However, many users of such hub oil seals 18 do not have the specialized tools. As a result, there is a significant incidence of installation damage of the hub oil seals 18 in the field.

Even when an appropriate specialized tool is available, damage occurs about 50% of the time when the installation procedure is performed by an untrained or inexperienced user.

The conventional specialized tool currently provided by hub oil seal manufacturers are typically expensive and heavy. These tools used to be distributed free to large users, such as OEM accounts and fleets, and some after market distributors buy them for rental to individual customers. Moreover, the conventional installation tools typically involve hard driving of the seal into the counterbore in which it is received with very little visual or auditory feedback to the installer.

The disposable seal driver kit 10 comprising a piece of wood 12 and the cup-shaped seal driver 14 can be provided free with the hub oil seal that needs to be installed, thereby making it available to all users. For this purpose, the piece of wood and seal driver are disposable and can be packaged with each individual hub oil seal. In this way, confusion about tool selection is eliminated and concerns about storage, accidental loss and obsolescence of the disposal seal drive are also eliminated. To reduce size, the piece of wood can be omitted from the kit 10, leaving the user with instructions to obtain a piece of wood for pounding in the seal with a hammer or mallet.

As shown, the disposable seal driver 14 is a stamped steel shell having an upper flat wall 30, a frusto-conical downwardly extending wall 32 and a cylindrical skirt 34 extending to a lower circular drive edge 35. The cylindrical skirt 34 fits over the seal 18 to be driven into the cavity or counterbore 26. The flat top wall 30 has a thickness which enables a short piece of wood 12 to be hammered against the top wall 30 resulting in some deformation or crumpling of the top wall 30. However, the driving force is transmitted through the frusto-conical wall 32 and the cylindrical skirt 34 against the outer ring 16 of the seal 18 at its stiffest or strongest point, thereby enabling the hub oil seal 18 to be driven into the cavity or counterbore 26 without damage.

While a 1"×1" piece of wood 12 can be used, it is to be understood that other sizes of the piece of wood 12 can be provided, such as a 6" length of a 2"×2" piece of wood or a 6" length of a 2"×4" piece of wood.

One prototype of the disposable seal driver 14 has a top wall 30 having a 1.64 inch diameter with the frusto-conical or tapered wall 32 extending out to a diameter of 4.47 inch. The angle subtended between the top wall 30 and the frusto-conical side wall 32 is approximately 30°. The disposable seal driver 14 can be punched from a piece of steel having a diameter of approximately 5.25" and a thickness of between 0.055 and 0.065 inch steel. A prototype was made from a center slug of steel having the dimensions of 5.25 diameter by 0.0598 thick steel.

The height of the disposable driver 14 is 1.15 inch and a round 38 between the frusto-conical wall and the cylindrical skirt has an approximately 0.13 inch radius.

Figure 3:
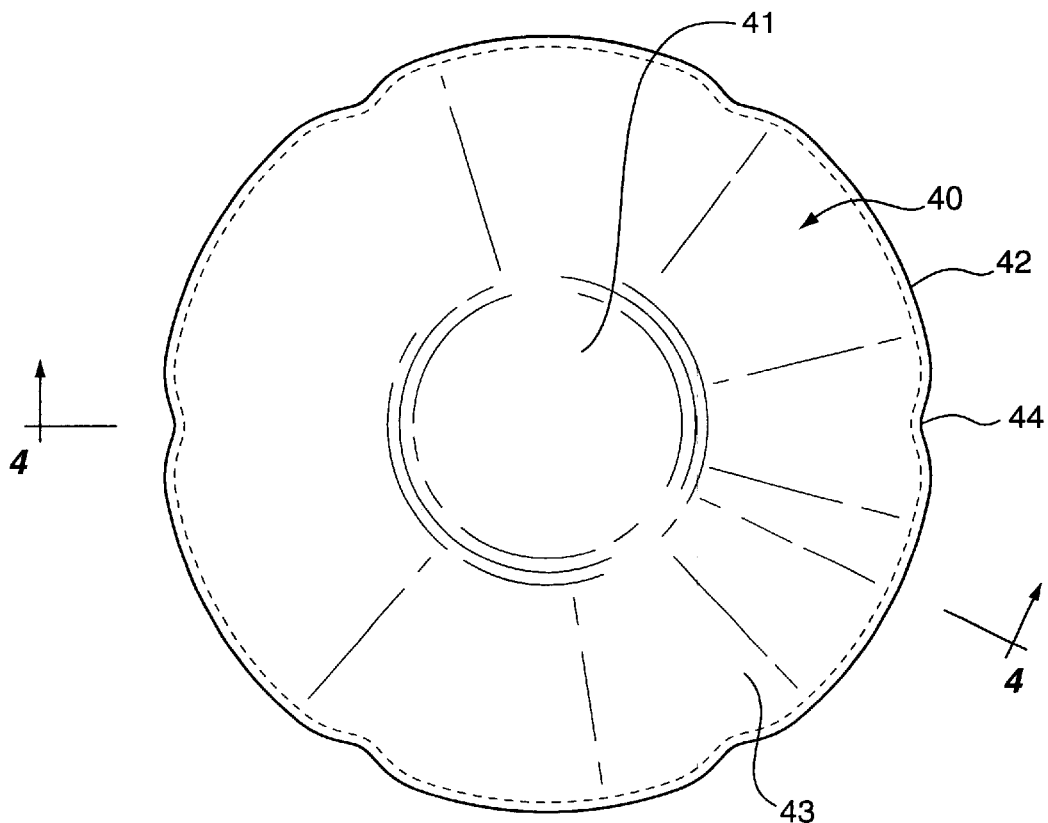
FIG. 3 is a top plan view of a corrugated cup-shaped disposable seal driver of a modified embodiment of the present invention.

In FIG. 3 there is illustrated a top plan view of a modified embodiment of a cup-shaped seal driver 40 having a top wall 41, a cylindrical skirt or outer rim 42 with indentations or corrugations 44 in the rim 42 and a frusto-conical intermediate wall 43 between the top wall 41 and the skirt or rim 42. Six corrugations 44 are shown, although it is to be understood that, for properly locating the cup-shaped seal driver 40, there must be at least three corrugations 44.

Figure 4:
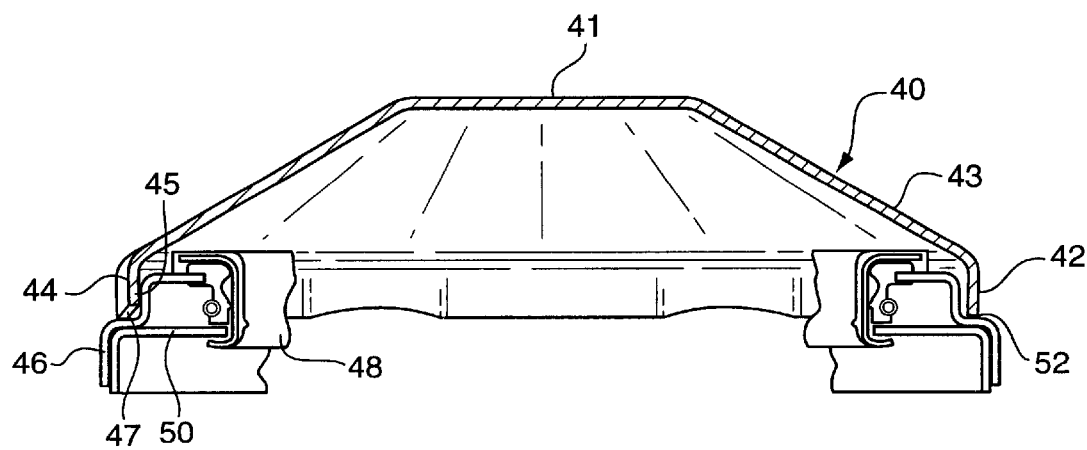
FIG. 4 is a sectional view through the corrugated cup-shaped disposable seal driver shown in FIG. 3 and is taken along lines 4—4 of FIG. 3.

As best shown in FIG. 4, an inner surface 45 of each corrugation 44 engages the outer diameter of an outer ring 46 of a seal 48 while a lower edge 47 of the circular rim 42 engages the seal 48 at a point where the outer ring of the seal 48 overlaps an inner ring 50 of the seal, namely, at point 52 where the seal 48 is strongest by reason of the outer ring 46 overlapping the inner ring 50 of the seal 48 at its strongest point 52, indicated in FIG. 4.

From FIGS. 3 and 4, it is to be understood that the corrugations 44 hold the outer rim 42 over the strongest point 52 where the inner and outer rings 46 and 50 of the seal 48 overlap to ensure against crushing or deforming the seal 48 when driving seal 48 into a cavity or counterbore.

It will be understood that the disposable seal driver 14 or 40 is designed to buckle or deform slightly, changing its tone, when the seal 18 or 48 bottoms out in the cavity or counterbore 26. This auditory feedback, plus the visible indentation in the deformed or crumpled area of the top wall 30 or 41, helps prevent accidental overdriving that can result in damage to the hub oil seal 18 or 48.

From the foregoing description, it will be understood that the disposable seal driver kit 10 and the disposable seal driver 14 or 40 of have a number of advantages, some of which have been described above and others of which are inherent in the invention. For example, the kit 10 simply can include the disposable seal driver 14 or 40 only without the piece of wood 12 with instructions to a user to use a short piece of wood, such as a piece of 2"×4". Also, once the seal driver 14 or 40 is used, it can be disposed of or can be saved for use with other similar seals.

Also, from the foregoing description, it will be apparent that modifications can be made to the seal driver kit 10 and seal driver 14 or 40 of the present invention without departing from the teachings of the invention. Accordingly, the scope of the invention is only to be limited as necessitated by the accompanying claims.

What is claimed is:

1. A short, compact, one piece, disposable seal driver for driving in a hub oil seal into a cavity for receiving same in a wheel assembly for a wheeled vehicle, said seal driver comprising a short metal cup-shaped member having a top flat wall, a short intermediate frusto-conical wall and a short, lower cylindrical skirt having a circular bottom drive edge constructed and arranged for the placing of the circular bottom drive edge of the seal drive member directly against the hub oil seal and for being driven against the hub oil seal to push the hub oil seal into the cavity.

2. The disposable seal driver of claim 1 having a height from said top wall to said bottom edge of said lower cylindrical skirt of between 1" and 2", depending on the size of the oil seal to be installed.

3. The seal driver of claim 1 being formed from a piece of steel.

4. The seal driver of claim 3 wherein said piece of steel has an outer diameter of between 5" and 6" and a thickness of between 0.05" and 0.07".

5. The seal driver of claim 4 wherein the thickness of said piece of steel is approximately 0.06".

6. The seal driver of claim 1 wherein said top wall has an approximate diameter of between 1.6" and 1.7".

7. The seal driver of claim 1 wherein said frusto-conical skirt has a diameter of between 4" and 5".

8. The seal driver of claim 1 wherein said intermediate frusto-conical wall forms an angle with said top wall of between 20° and 40°.

9. The seal driver of claim 1 wherein the junction between said intermediate frusto-conical wall and said lower cylindrical skirt is defined by a circular round having a radius of between 0.1 and 0.2 inches.

10. The seal driver of claim 9 wherein said round has a radius of 0.13 inch.

11. A disposable seal driver for driving in a hub oil seal into a cavity for receiving same, said seal driver comprising a metal cup-shaped member having a top flat wall, an intermediate frusto-conical wall and a lower cylindrical skirt having a circular bottom drive edge and said cylindrical skirt having indentations therein for locating said lower drive edge of said cylindrical skirt over the strongest point of the seal to be driven into the cavity where inner and outer rings of the seal overlap each other.

12. The seal driver of claim 11 wherein said indentations comprise at least three corrugations in said cylindrical skirt.

13. A combination of a hub oil seal and a disposable seal driver packaged together and comprising a hub oil seal and a short, compact, one piece, generally cup-shaped disposable seal driver having a top flat wall, a short intermediate frusto-conical wall and a short, lower cylindrical skirt having a circular bottom drive edge, said hub oil seal being positionable adjacent a cavity in a wheel assembly for a wheeled vehicle and said seal driver being constructed and arranged for the placing of said circular bottom drive edge directly against said hub oil seal for driving said hub oil seal into the cavity in the wheel assembly.

* * * * *